INVENTOR.
HAROLD PALLATZ

United States Patent Office 3,398,369
Patented Aug. 20, 1968

3,398,369
HIGH VOLTAGE METERING SYSTEM
Harold Pallatz, Flemington, N.J., assignor to Industrial Instruments, Inc., Cedar Grove, N.J., a corporation of New Jersey
Filed Mar. 30, 1965, Ser. No. 443,852
3 Claims. (Cl. 324—119)

ABSTRACT OF THE DISCLOSURE

A metering system for effectively switching the terminals of a voltmeter connected across a high voltage direct current power supply without the necessity for utilizing mechanically operated switching elements for switching the voltmeter. The separate terminals of the voltmeter are respectively connected to the output posts of the high voltage power supply through separate multiplier resistors. A pair of diodes are connected across the terminals of the meter on the sides of the multiplier resistors which are farthest away from the high voltage power supply. A connection is provided between non-corresponding electrodes of the diodes to ground.

---

Figure 1:
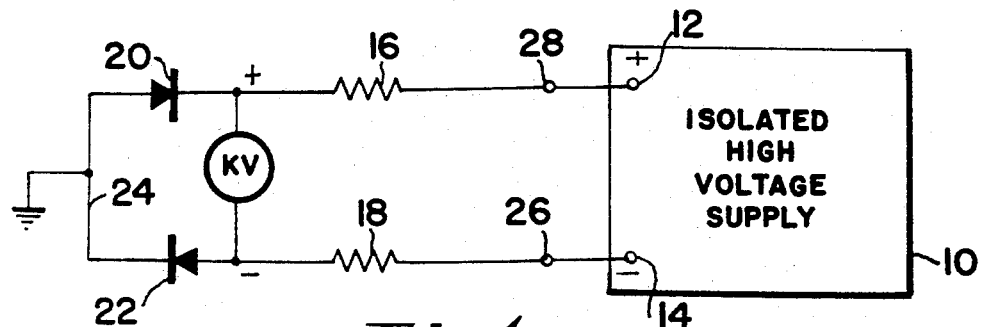

The present invention relates to means for effectively switching the terminals of a voltmeter connected across a high voltage power source, as either side of the power line is grounded, without the need for a mechanically operated switching element to assure that voltages of proper polarity are maintained across the meter terminals.

A conventional or typical voltmeter consists of a current sensitive meter in series with a multiplier resistor. The impedance of the meter in a voltmeter configuration is usually much less than the impedance of the multiplier resistor, and this is particularly true for metered high voltage power supply circuits where essentially all of the voltage to be measured is dropped across the multiplier resistor. Due to the construction of the typical current sensitive meters, it is undesirable to have a large potential drop between the meter terminals and the casing or housing of the meter or other parts of the meter because these meters are not designed, from an insulation standpoint, to withstand high voltage drops. The voltage which actuates the meter in only the small voltage across the two meter input terminals, as contrasted to the very high voltages supplied from the high voltage supply to be measured. The casing or housing of the high voltage meter which is mounted on a panel and exposed to contact by any one using the instrument is usually connected to ground for safety reasons. It is desirable always to position the voltmeter on the ground or low potential side of the multiplier resistor; otherwise the full potential of the high voltage source would be placed between the meter terminals and the metal casing and would cause arcs and damage to the meter.

To obtain either a positive or negative high voltage output from the high voltage power supply, provision is customarily made to ground the negative or positive output terminals respectively of the high voltage source. Heretofore, in order to maintain the correct polarity of voltage on the meter terminals, it has also been necessary to employ a high voltage toggle or reversing switch, or some suitable mechanically operated change-over device. Such switches or mechanically operated change-over devices are bulky and expensive, and present problems such as possible arcing and corona noise.

The present invention overcomes the need for additional switching mechanisms to switch the input terminals of the high voltage meter, and utilizes a simple circuit which automatically and effectively maintains the correct polarity on the meter terminals, thereby insuring proper meter deflection direction. This is done by the use of a pair of diode rectifiers connected across the meter terminals, with the anode of one diode connected to the cathode of the other diode and the common connection therebetween connected to ground. The circuit of the invention is simple, makes use of a minimum number of component parts, and eliminates a switching operation in high voltage apparatus.

Figure 2:
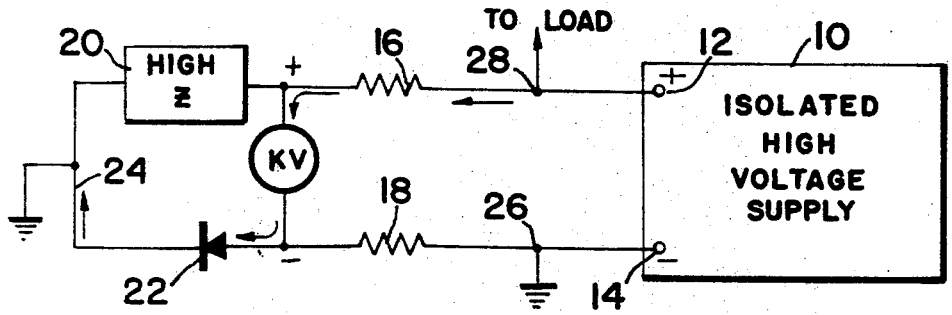
Figure 3:
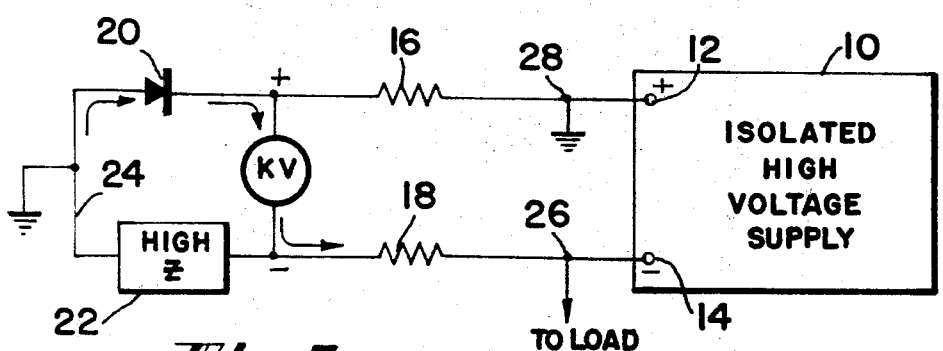

A more detailed description of the invention follows in conjunction with a drawing, wherein:

FIGURE 1 illustrates an embodiment of the invention employed in connection with an isolated high voltage power supply source; and FIGURES 2 and 3 are explanatory of the operation of the invention and illustrate the directions of current flow through the high voltage meter when different output terminals of the voltage supply are respectively grounded.

The high voltage apparatus includes an isolated or floating high voltage supply source 10 whose output terminals 12 and 14 are connected to a kilovoltmeter KV through suitable multiplier resistors 16, 18. Across the kilovoltmeter KV are placed a pair of diode rectifiers 20 and 22 connected with the anode of one diode rectifier, for example 20, connected to the cathode of the other diode rectifier 22, and the common connection 24 connected to ground.

The floating high voltage power supply 10 may, for example, supply a voltage of 10,000 or more volts to its terminals or posts designated + and —. The term "floating" refers to a power supply source in which there is no terminal grounded internally of the source. The multiplier resistor 16 and 18 have equal values and, in practice, are permanently connected in the meter circuit and the floating power supply, and are chosen to have the value necessary to provide the desired voltage reading range on the meter KV. The forward resistance of each diode rectifier 20 and 22 is relatively very small compared to the resistance of the multipliers 16 and 18. The back resistance or impedance of the diodes is very high.

In the operation of the system, if the operator desired to ground the negative output terminal or post (—) of the high voltage supply 10 in order to obtain a high voltage positive potential for the load, the negative output terminal will be grounded at 26 by the use of a suitable removable link or strap, as shown in FIGURE 2, and the load connected to point 28 on the hot or positive side of the voltage line. With the negative side grounded at 26, the multiplier resistor 18 is in electrically parallel relation with the forward resistance of diode 22. Since the forward resistance of diode 22 is much less than (a small fraction of) the resistance of multiplier resistor 18, all of the current flows in the meter KV through diode 22. The voltage appearing at the terminals of the meter is the forward voltage drop of the diode 22 and is essentially insignificant. The polarity of the diode 20 in this configuration (FIGURE 2) is such that it presents its back or high resistance to the flow of current and, hence, all of the current flows through multiplier resistor 16. Resistor 16 acts as the multiplier resistor for this particular configuration.

With the positive side or source terminal grounded at point 28 and the load connected to point 26, which is now the hot post, as shown in FIGURE 3, the multiplier resistor 16 is in electrically parallel relation with the forward resistance of diode 20. Since the forward resistance of diode 20 is much less than (a small fraction of) the resistance of multiplier resistor 16, all of the current flows in the meter KV through diode 20. The voltage appearing at the terminals of the meter is the forward voltage drop of the diode 20 and is essentially insignificant. The polarity of the diode 22 in this configuration (FIGURE 3) is such that it presents its back or high resistance to the flow of current and, hence, all of the current flows through multiplier resistor 18. Resistor 18 acts as the multiplier resistor for this particular configuration.

It will thus be seen that the terminals of the voltmeter KV are always connected at the proper polarity relative to the voltage source 10 regardless of which side of post 12 or 14 is grounded, without the need for a mechanically operated switching element for the meter, per se.

Another advantage of the present invention is that the voltmeter is at all times at or near ground potential— and this is an important safety measure for the operator when dealing with high voltage power supply sources. Further, a meter at ground potential does not require the same degree of electrostatic shielding that a floating meter necessitates.

The term "ground," as used herein, is deemed to include any point of zero or reference potential.

What is claimed is:

1. A metering circuit for a high voltage direct current power supply having a pair of high voltage output posts and means for grounding one of said posts, comprising a meter, a first multiplier resistor having a resistance value greater than that of said meter connected between one terminal of said meter and one high voltage post of said pair, a second multiplier resistor having a resistance value greater than that of said meter connected between the other terminal of said meter and the other high voltage post of said pair, a first diode having its cathode connected to one side of the meter on the side of the first multiplier resistor farthest away from the high voltage power supply and its anode connected to ground, a second diode having its anode connected to the other side of the meter on the side of the second multiplier resistor farthest away from the high voltage power supply and its cathode connected to ground, whereby the anode of the first diode is connected to the cathode of the second diode and to ground.

2. In combination, a floating high voltage direct current power supply source having positive and negative output posts, means for connecting one post to a point of reference potential, a kilovoltmeter, a connection including a multiplier resistor from one terminal of said kilovoltmeter to the positive post of said source, a connection including another multiplier resistor from the other terminal of said kilovoltmeter to the negative post of said source, said multiplier resistor being equal to or greater than the value of the resistance of the meter, a diode having an electrode connected to one terminal of said kilovoltmeter on the side of one multiplier resistor farthest from said source, another diode having a non-corresponding electrode connected to the other terminal of said kilovoltmeter on the side of the other multiplier resistor farthest removed from said source, a direct connection between said other electrodes of said diodes, and a connection from said point of reference potential to said direct connection.

3. A combination in accordance with claim 2, wherein the cathode of one diode is connected to that terminal of said kilovoltmeter which is connected to the positive post of said source, while the anode of the other diode is connected to the other terminal of said meter which is connected to the negative post of said source, said multiplier resistors being equal in value, the forward or current resistance of said diodes being a small fraction of the resistance of either multiplier resistor.

References Cited
UNITED STATES PATENTS

| | | | |
|---|---|---|---|
| 2,665,395 | 1/1954 | Feinberg | 324—110 X |
| 2,905,899 | 9/1959 | Miller et al. | 324—119 X |
| 3,281,689 | 10/1966 | Schneider et al. | 324—119 X |

RUDOLPH V. ROLINEC, *Primary Examiner.*

E. F. KARLSEN, *Assistant Examiner.*

UNITED STATES PATENT OFFICE
CERTIFICATE OF CORRECTION

Patent No. 3,398,369                      August 20, 1968

Harold Pallatz

It is certified that error appears in the above identified patent and that said Letters Patent are hereby corrected as shown below:

In the heading to the printed specification, lines 3 to 5, "assignor to Industrial Instruments, Inc., Cedar Grove, N. J., a corporation of New Jersey" should read -- assignor, by mesne assignments, to Beckman Instruments, Inc., Fullerton, Calif., a corporation of California --. Column 4, line 11, "resistor" should read -- resistors --; line 29, after "rent" insert -- passing --.

Signed and sealed this 3rd day of February 1970.

(SEAL)
Attest:

Edward M. Fletcher, Jr.                  WILLIAM E. SCHUYLER, JR.
Attesting Officer                             Commissioner of Patents